Jan. 8, 1952  H. W. SPRING  2,581,978
TOOLMAKER'S PARALLEL SCREW CLAMP
Filed Dec. 6, 1947
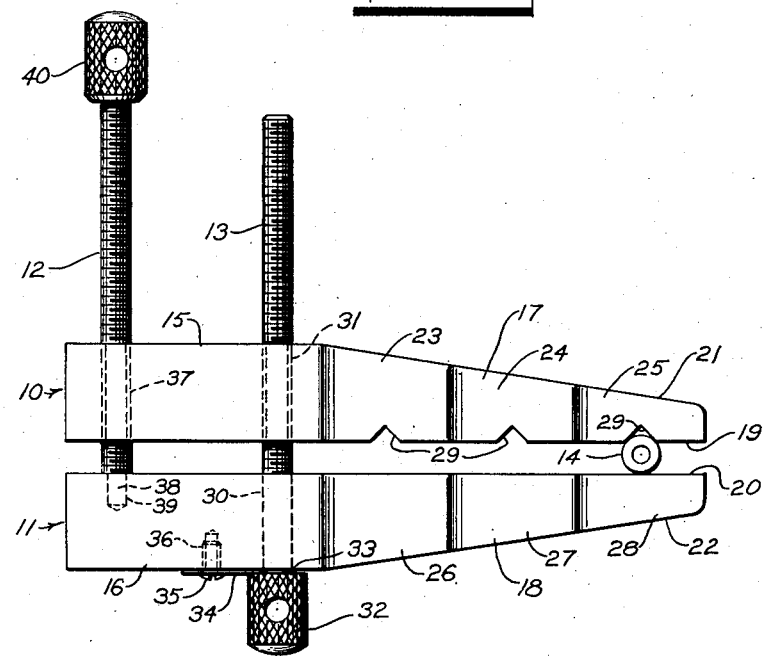
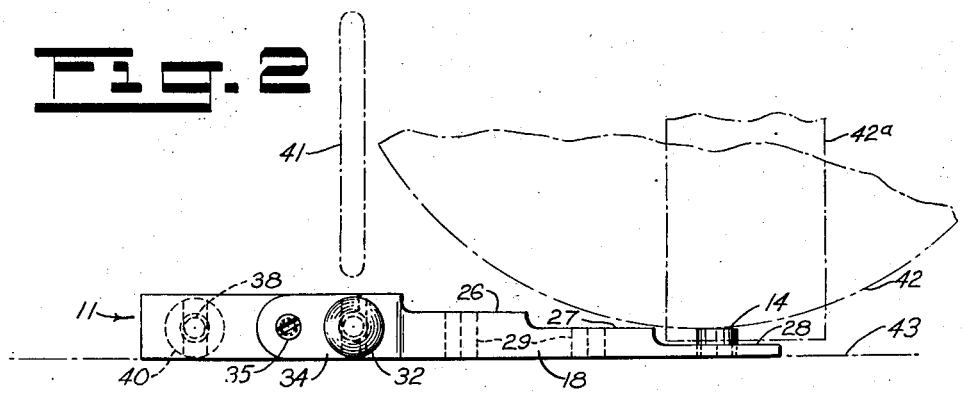
INVENTOR.
HARRY W. SPRING
BY
H. G. Manning
ATTORNEY Patented Jan. 8, 1952

2,581,978

UNITED STATES PATENT OFFICE 2,581,978

TOOLMAKER'S PARALLEL SCREW CLAMP

Harry W. Spring, Waterbury, Conn.

Application December 6, 1947, Serial No. 790,036

1 Claim. (Cl. 144—300)

This invention relates to clamps, and more particularly to an adjustable clamp having a pair of jaws for holding a work piece in engagement with a tool.

One object of this invention is to provide a device of the above nature in which the jaws have thin end portions adapted to hold a thin work piece firmly, whereby the jaws will not interfere with a tool working upon said work piece.

Another object is to provide a device of the above nature in which the jaws have portions of different thicknesses in a longitudinally stepped formation so that a single clamp is adapted to hold work pieces of different thicknesses efficiently.

Another object is to provide a device of the above nature which includes a tension screw for controlling the spacing of the jaws, and an outwardly disposed compression screw for holding the jaws in parallel relation.

A further object is to provide a device of the above nature which will be simple in construction, inexpensive to manufacture, easy to manipulate, compact, ornamental in appearance, and very efficient and durable in use.

With these and other objects in view, there has been illustrated on the accompanying drawing one form in which the invention may conveniently be embodied in practice.

In the drawings,

Fig. 1 is a plan view of the improved tool makers's clamp and a work piece held therein.

Fig. 2 is a side view of the same, showing a working tool and a screw operating pin in broken lines.

Referring now to the drawings in which like reference numerals denote corresponding parts throughout the several views, the numerals 10 and 11 indicate a pair of jaws clamped by a compression screw 12, and a tension screw 13 to hold a cylindrical work piece 14. The respective jaws 10, 11 include rectangular base portions 15, 16, and outwardly-extending arms 17, 18, which have parallel inner clamping faces 19, 20, and outer tapered faces 21, 22.

The upper surface of the arm 17 of the jaw 10 is formed as a series of steps 23, 24, 25 so that said arm 17 is successively reduced in thickness in an outward direction.

The arm 18 is similarly formed with steps 26, 27, 28 in such a fashion that the steps of the respective arms 17, 18 are coplanar. The clamping face 19 of the jaw 10 is provided with a plurality of angular recesses 29, each of these recesses being disposed adjacent the center of one of the steps 23, 24, 25 whereby small work pieces may be firmly clamped. The clamping force exerted by the jaws 10 and 11 is controlled by the tension screw 13 which passes through a plain bore 30 in the jaw 11 and into a tapped bore 31 in the jaw 10, the jaw being held under a knurled capstan head 32 of the screw 13.

In order to retain the tension screw 13 against longitudinal movement in the jaw 11, said screw is provided with an annular groove 33 immediately adjacent the head 32. A notched retainer clip 34 is engaged in said groove 33 and held against the outer face of the base portion 16 of the jaw 11 by means of a screw 35 secured in a tapped hole 36 in the base portion 16.

The compression screw 12 is entered through a tapped bore 37 in the base portion 15 of the jaw 10 and is provided with a reduced end bearing 38 which is received in a bearing aperture 39 in the inner face 20 of the jaw 11. The screw 12 further has a capstan head 40 which is identical to the head 32 of the screw 13.

Operation

In operation, the clamping jaws 10 and 11 will be separated to the extent necessary for the insertion of the work piece by rotating the screws 12, and 13. An operating pin 41 indicated by broken lines in Fig. 2, may be employed to provide greater leverage in the manipulation of the screw heads 32 and 40. It will be noted that a receding movement of the parallel jaws 10 and 11 will be obtained by rotating the screws in the same direction. The work piece 14 will then be inserted between the clamping arms 17 and 18 in position to be clamped in one of the angular recesses 29.

In determining the proper recess 29 to receive the work piece, the thickness of the work piece will be taken into account. Thus, when the work piece 14 is inserted with its lower side in flush relation with the bottom surface of the jaws 17 and 18, so as to receive support from a table 43 upon which the clamp is placed, its upper side will project sufficiently above the adjacent stepped sections to permit the unobstructed application of a working tool such as a grinding wheel 42.

In the instance shown in the drawing, the work piece 14 is clamped between the stepped sections 25 and 28, whereby a limited grinding operation may be performed by the longitudinally disposed wheel 42. If the wheel is to be applied in a lateral direction, as indicated by the lines 42a, the extent of the grinding operation will be limited only by the thickness of the stepped sections 25, 28.

Further, if a work piece of greater thickness is to be held in the clamp, it will be preferable to insert said work piece between the stepped sections 24, 27 or 23, 26 whereby the clamp will engage the work-piece more firmly.

After the work piece has been properly located between the clamping arms 17, 18, the screws 12 and 13 will be rotated to close the arms thereon. In order to secure the maximum clamping force, the pin 41 may be inserted in the capstan heads 32, 40 and used to tighten the screws. The clamp will now hold the work piece firmly so that it may be operated upon by a tool.

One advantage of this invention is that the necessity for keeping a number of clamps of different thicknesses will be avoided, inasmuch as the improved tool maker's clamp will serve to efficiently grip work pieces of different thicknesses.

Another advantage is that the relative position of the parallel jaws may be controlled by the tension screw. Thus, if the compression screw 12 is backed off sufficiently to enable free operation of the tension screw 13, further operation of the screw 12 will be unnecessary until the jaws are in their final position, whereupon the compression screw 12 may be tightened in order to firmly clamp the work.

While there has been disclosed in this specification one form in which the invention may conveniently be embodied, it is to be understood that this form is shown for the purpose of illustration only, and that the invention is not to be limited to the specific disclosures, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a toolmaker's clamp, a pair of parallel jaws comprising coplanar bases adapted to rest flat upon a table or bench, said jaws having opposing straight inner faces and stepped upper surfaces of successively smaller height to permit the work held between said jaws to be inserted below a grinding wheel and lie in a small vertical space, the inner side face of one of said jaws having work-engaging angular recesses, and a pair of parallel headed screws extending at right angles to said jaws and located within aligned pairs of cylindrical holes, one of each of said pairs of holes being tapped, each of said screws being in threaded engagement with a tapped hole and being freely rotatable in the other of the pair of holes, and abutment means on each of said screws to engage the jaw in which it freely rotates, for releasably clamping said jaws against a work piece located between one of said angular recesses and the flat straight edge of the adjacent jaw.

HARRY W. SPRING.

REFERENCES CITED

The following references are of record in the file of this patent:

UNITED STATES PATENTS

| Number | Name | Date |
|---|---|---|
| 269,446 | Moss | Dec. 19, 1882 |
| 876,908 | Ljunglof | Jan. 14, 1908 |
| 1,286,314 | Hertle | Dec. 3, 1918 |
| 1,370,994 | Pomerenke | Mar. 8, 1921 |
| 1,855,944 | Delacour | Apr. 26, 1932 |
| 2,441,743 | Albert | May 18, 1948 |